Patented Apr. 21, 1925.

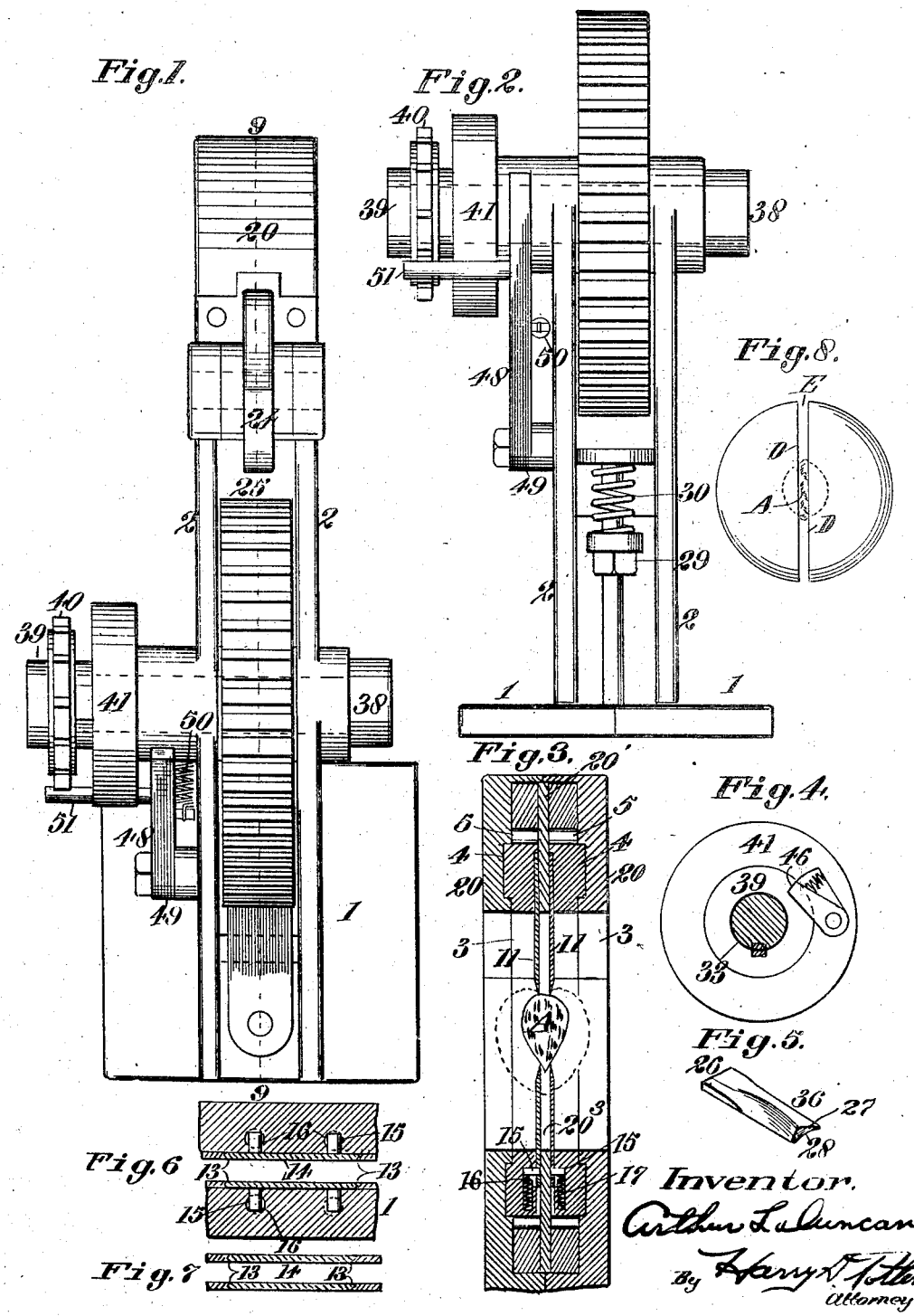

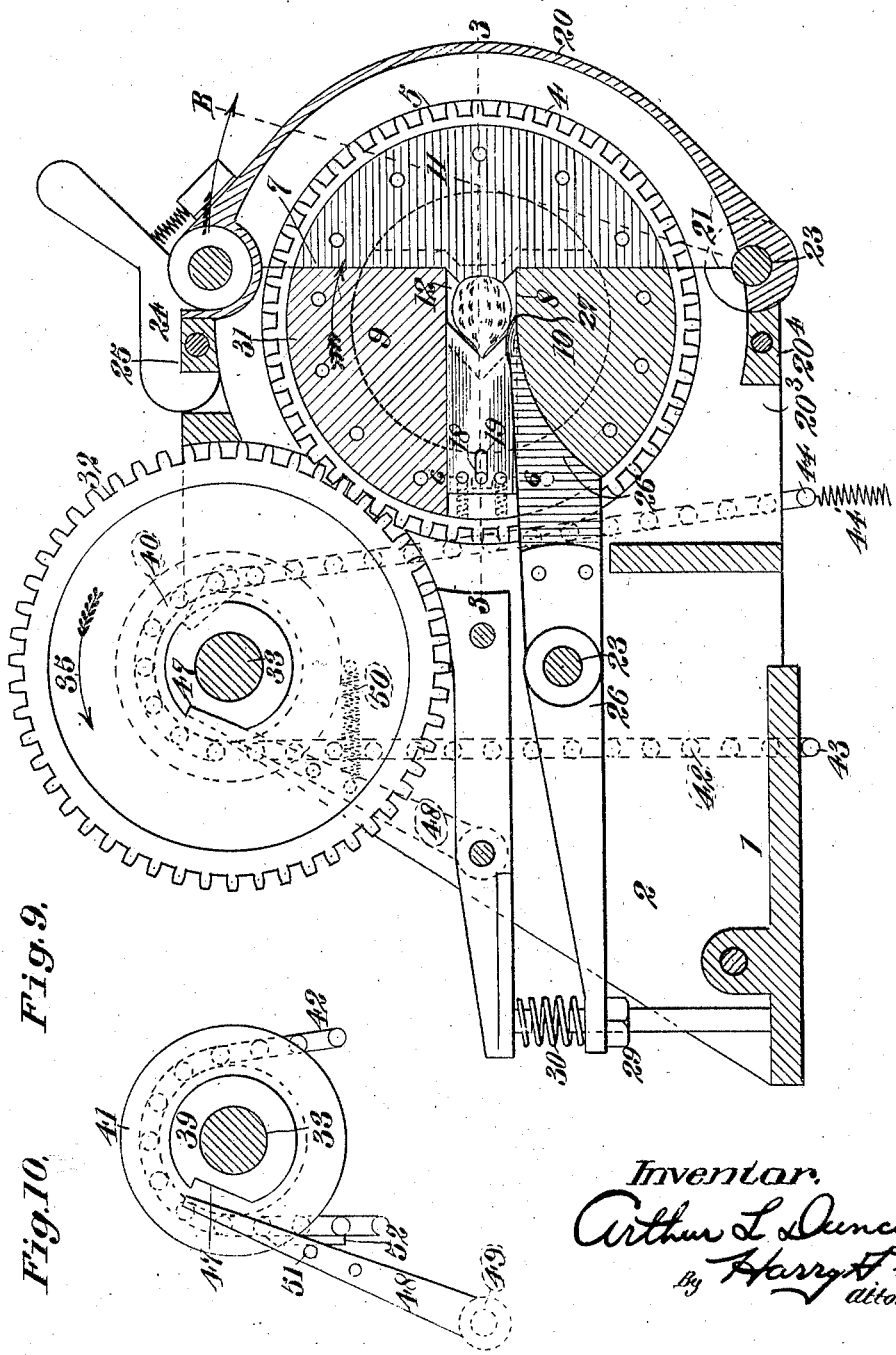

1,534,507

UNITED STATES PATENT OFFICE.

ARTHUR L. DUNCAN, OF PIEDMONT, CALIFORNIA.

METHOD OF AND APPARATUS FOR BISECTING FRUIT AND REMOVING A CIRCUMFERENTIAL SLICE THEREFROM.

Application filed November 10, 1924. Serial No. 748,821.

*To all whom it may concern:*

Be it known that I, ARTHUR L. DUNCAN, a citizen of the United States, residing at Piedmont, in the county of Alameda and State of California, have invented certain new and useful Improvements in Methods of and Apparatus for Bisecting Fruit and Removing a Circumferential Slice Therefrom, of which the following is a specification.

The present invention relates to a method and apparatus designed particularly for use in the bisecting of fruit and the removal of the pit, stone or core therefrom prior to canning.

The said method invention relates to the cutting of a circumferential slice from the fruit to the approximate depth of the stone and the removal of the cut slice, providing a fruit with a circumferential annular space extending from the surface to the approximate surface of the stone or pit.

It has been discovered in the preparing of single stone fruit for canning that the pitting knife at often times fails to cut close around the pit, leaving a pit recess of considerable area in the halves of fruit after the pit is removed, but that if the slice is removed to a depth following the contour of the pit, that the surface of the pit may be more closely followed in separating the half sections therefrom than when considerable material is left between the lower edge of the slice and the surface of the pit.

In carrying out the invention I position fruit to be pitted in operative position relatively to cutting knives so that the stone thereof is circumferentially gripped by the cutting knives which bury into the pulp to the approximate surface of the pit in their cutting action to sever the slice from the fruit, rotating the fruit and knives on an axis through the stone at right angles to the slice, with means projected between the knives, whereby the slice is expelled from the fruit, leaving two halves adhering to the stone.

The present invention also consists in a trimmer adapted on the rotation of the fruit and stone to closely follow the contour of the stone and cut the slice therefrom, at the same time ejecting the slice from between the half sections of fruit. The invention further consists in yieldably mounting the slice severing means and constructing the same in such manner that it rides freely on the stone.

Other objects are in the mounting of the knives: the closing of the same about a fruit; the provision of means for clamping the stone at the blossom and stem ends, and the provision of means for bringing the opening in the knives through which the fruit is inserted and removed to the same position after each operation.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 1 is a view in top plan of the preferred embodiment of my invention.

Fig. 2 is a view in front end elevation.

Fig. 3 is a horizontal transverse sectional view taken on line 3—3 of Fig. 9, illustrating the knife mounting ring gear and its bearing.

Fig. 4 is a view in detail of the pawl and ratchet mechanism associated with the operating gear.

Fig. 5 is a view in perspective of one end of the fruit slice ejecting member operating between the slice cutting walls.

Fig. 6 is a sectional view of the spring held knives taken on line 6—6 of Fig. 9.

Fig. 7 is a sectional view of the spring held knives taken on line 7—7 of Fig. 9.

Fig. 8 is a view of the fruit with a strip or slice removed therefrom.

Fig. 9 is a longitudinal central sectional view taken on line 9—9 of Fig. 1.

Fig. 10 is a view in detail section of the clutch means associated with the operating gear.

In the drawings, wherein like characters of reference designate corresponding parts, the frame base is indicated by the numeral 1, and upwardly from opposite sides of the same extend side plates 2. The side plates at one end are provided with aligned apertures 3 affording an opening transversely therethrough.

Carried by the inner faces of the members 2, at points surrounding the openings 3 are the peripherally toothed rings 4, each held with its inner face spaced from the inner face of the other in any suitable manner, and disposed with the peripheral teeth 5 in transverse register. Each ring 4 on its inner face carries a plate 6 secured at its periphery thereto, the respective plates and rings being divided transversely on the line 7 and the plates being divided on the line 8 at right angles to the line 7, the line 8 affording a recess between adjacent edges of the same plate.

By dividing the plates on lines 7 and 8, the same are separated into the segments 9 and 10, triangular in elevation, and the segment 11 semicircular in elevation. The edges of the plates on the line 7 are preferably sharpened to constitute knife or cutting edges, and the space 12 between the adjacent walls of the triangular segments 9 and 10 is sufficient to accommodate a fruit pit or stone, indicated by the letter A.

Adjacent edges of the segments 9 and 10 of the respective plates are longitudinally grooved as at 13 to receive the tongue formed edges of plates 14 mounted within said spaces 12 to slide radially thereof. Each plate 14 at its inner end mounts the laterally disposed pins 15 projecting in slotted recesses 16 in the ring 4, Figs. 3 and 6, and bearing against these pins and seated within the recesses are coiled springs 17 acting to force the plates 14 forwardly in the recess 12.

A retaining pin 18 carried by the respective rings 4 projects into an elongated slot 19 in the plate 4 and assists in precluding the disengagement of the plate from the walls of the segmental cutting members 9 and 10.

Referring to Fig. 3, it will be observed that the body of the side walls 2 surrounding the openings 3 is provided with a hinged portion 20 opening on a line 21, with which is adapted to register the blade forming line 7 of the plates 11. The hinged portion 20 of the side frame members 2, constituting the bearing in which rotate the rings 4, is fulcrumed to the main portion of the plates 2 as at 23 and the upper portion thereof mounts a latch or other releasable securing means 24 adapted to engage over a stationary portion 25 carried by the upper end of the side plates 2.

By carefully examining Fig. 3, it will be observed that the portion 20 carries what may be termed a dividing plate 20' which projects between the members 4 and against which plates 11 rotate. A dividing plate $20^2$ likewise depends from the member 25 downwardly between the plates 11, and a third dividing plate $20^3$ extends upwardly between the plates from the member $20^4$. These dividing plates maintain the plates 11 separated at all times, and due to the fact that they terminate short of projecting inwardly beyond the inner surface of the members 4 they in no way interfere with the slice cut by the knives.

By observing Fig. 9 of the drawings, it will be apparent that on the registering of the line 7 of the plates with the line 21 of the ring bearing, that the operation of the latch 24 will admit of the swinging open of the segmental portion 20 of the bearing to the line B, and that during this operation the portion of the rings 4, due to their being interlocked in the hinged segmental section, will not drop therefrom and cannot be removed therefrom unless rotated on the axis of the entire rings. When in this position, with the segmental section 20 open to the line B, Fig. 9, and the knives or cutting blades 9 and 10 in their position, also indicated in Fig. 9, the fruit to be bisected, for example, the peach, is gripped by the operator with the blossom end horizontally disposed and the line of the seam or joint of the stone held in a vertical plane.

When in this position, the operator lines the blossom tip between the plates and centers the same vertically in the recess 12, and then forces the fruit into the knives until, by experience, it is thought that the stem end of the pit or stone is within the recess 12 inside of the line 7. When in this position, the segmental portion 20 of the bearing is closed, and during such closing a cutting edge of the arcuate segment 6 cuts into the pulp of the fruit and completes the severing of a slice circumferentially therefrom.

The slice circumferentially cut from the positioned fruit on the parts being closed to the position, as in Fig. 9, is transversely cut at its base and ejected from between the inner faces of the plates by a slice cutting and ejecting implement 26, fulcrumed as at 27 within its length, with its free end extending between the plates and terminating adjacent the recess 12.

The operating end of the member 26 is substantially triangular in elevation and is arranged with the point 27 disposed upwardly to ride in the surface of the pit A of the fruit and with the relatively flat cutting edge 28 disposed downwardly to make a relatively straight transverse cut at the base of the slice between the plates.

To admit of the member 26 being yieldably maintained at all times in contact with the surface of a pit or stone A contained in a positioned fruit, the rear end of the member 26 is limited in its downward movement by an adjustable stop 29 and is normally held downwardly by a yieldable spring 30.

On the positioning of the fruit to be bisected and a slice removed therefrom in operative position relative to the slice forming and cutting means, it will be observed that the open end of the member 26 will be inserted into that portion of the formed slice between the segments 10. The slice is removed or ejected from between the plates by the rotation of the gears 4 in the direction of the arrows 31, Fig. 9, and this is accomplished by a driving gear 32 carried on a shaft 33 and disposed in intermeshing relation with the teeth of the gears 4. The gear 32 is operated in the direction of the arrows 35 by the hereinafter described mechanism, and during such rotation the encompassed fruit with its stone or pit A gripped and held in the recess 12 is rotated with the plates in the direction of the arrows 31, and during such rotation the slice lying between the plates is directed radially therefrom by the curved expelling surface 36 of the member 26, and is directed through an outlet 37 in the base 1 of the frame.

On the completion of a single revolution of the members 4, the same come to a state of rest with the line 7 in register with the line 21, enabling the swinging open of the portion 20 of the bearing and the removing of the bisected fruit therefrom, the fruit after being removed appears as in Fig. 8, consisting of the sections D adhering to the pit or stone A and separated by a circumferential groove E formed in the pulp to the depth of the surface of the pit or stone.

The gear 32 rotates with the shaft 38, the latter projecting beyond one side of one of the plates 2 and having keyed thereto a collar 39. A sprocket 40 with which is connected a flanged hub 41 is mounted to rotate on the collar 39 and over the same extends an operating chain 42, the end 43 of which is adapted for connection with an operating lever and the end 44 of which is secured to a stationary support by a yieldable spring 44'. The flanged hub 41 mounts a pawl 45 spring pressed to ride on the surface of the collar 39 and the pawl, when the parts are in a state of rest, as in Fig. 9, is adapted to be received in a notch 46 in the collar 39. The collar is also provided with a notch 47 opposing the notch 46, and with said notch 47 is adapted for cooperation a revolutionary limiting pawl 48 fulcrumed to one of the members 2, as at 49, a spring 50 normally drawing the free end thereof toward the member 39. The pawl 48 carries a laterally projecting pin 51, beneath which rides a throw-out lug 52 carried by the chain 42, and which lug lies beneath the pin when the parts are in position, as in Fig. 9.

With the parts as illustrated, the operator depressing the end 43 of the chain rotates the sprocket 40 and the pawl 45, gauging the notch 46, causing a rotation of the gear 32 in the direction of the arrows 35 and consequently extending the spring 44. After the end 43 of the chain 42 has moved a slight distance downwardly, the throw-out lug 52 rides from beneath the pin 51, admitting the spring 50 to cause the free end of pawl 48 to ride on the member 39. After the member 39 has made a complete revolution, the notch 47 will align with the end of the pawl 48 and the pawl will thus limit the operative revolution of the shaft 33.

At this time, the operator releases pressure and admits of the spring 44 to draw the chain 42 backwardly, at which time the parts of the clutch mechanism for the drive gear assume the position as is illustrated in the drawings, and are ready for another operation.

I claim :—

1. An apparatus for severing and removing a circumferential slice from a fruit, including means for cutting the fruit inwardly to sever a slice therefrom and for gripping the stone, means for rotating the fruit, stone and slice, and means for severing the inner surface of the slice from the fruit and for ejecting the slice from the remaining half sections.

2. An apparatus for severing and removing a circumferential slice from a fruit, including means for cutting the fruit inwardly to sever a slice therefrom and for gripping the stone, means for rotating the stone and bringing the same to a position of rest corresponding to its original position, and means for cutting the slice transversely to the slice forming cuts.

3. An apparatus for severing a circumferential slice from a fruit, including means for cutting the fruit inwardly to the depth of the stone to sever a slice therefrom and to grip the stone, means for rotating the fruit, stone and slice, and means for cutting the slice inwardly from its surface to the inner edge and for severing the inner edge from the stone and for ejecting the slice from between the fruit half sections.

4. An apparatus for preparing single stone fruit for canning, including means for cutting the fruit circumferentially to sever an annular slice therefrom, means for rotating the fruit and cutting means, and stationary means for cutting the slice inwardly from its surface and at right angles to the slice forming cuts to sever the base of the slice from the stone.

5. An apparatus for preparing single stone fruit for canning, including means for cutting the fruit circumferentially to sever an annular slice therefrom, means for rotating the fruit and cutting means, and means for cutting the slice at right angles to the slice forming cuts.

6. An apparatus for preparing single stone fruit for canning, including means for cutting the fruit circumferentially to sever an annular slice therefrom, means for rotating the fruit and cutting means, and means for ejecting the annular slice from the remainder of the fruit.

7. An apparatus for preparing single stone fruit for canning, including means for cutting the fruit circumferentially to the depth of the stone to sever an annular slice therefrom and for gripping the stone in the plane of the slice, means for imparting rotation to the fruit and stone on an axis through the stone at right angles to the slice, and means for cutting the slice inwardly from its surface at right angles to the slice forming cuts to sever the base of the slice from the remainder of the fruit and for ejecting the cut slice from the remaining fruit half sections.

8. An apparatus for preparing single stone fruit for canning, including opposing pairs of parallel spaced knives, a rotatable ring peripherally mounting the same and split transversely on the line of the cutting edge of one of said pair of knives, means for imparting rotation to the ring, and a fruit slice ejector means projecting between the knives.

9. An apparatus for preparing single stone fruit for canning, including pairs of parallel spaced knives, a rotatable ring peripherally mounting the same and split transversely on the line of the cutting edge of one of said pair of knives, means for imparting rotation to the ring, a slice ejector means projecting between the knives and yieldable means for forcing the end of said ejector toward the center of the axis of rotation of the ring.

10. An apparatus for preparing single stone fruit for canning, including pairs of parallel spaced knives, a rotatable ring peripherally mounting the same and split transversely on the line of the cutting edge of one of said pair of knives, means for imparting rotation to the ring, and means projecting between the knives and provided with a bevelled surface for ejecting the material from between the knives on the rotation of the fruit.

11. An apparatus for preparing single stone fruit for canning, including pairs of parallel spaced knives arranged with their cutting edges in opposing relation with portions spaced from each other to form a stone receiving pocket; a rotatable ring mounting the knives and split transversely on the line of the cutting edge of one of said pair of knives, a bearing for the ring split to align with the split of the ring, means for preventing accidental removal of the ring sections from the bearing when the split portion of the bearing is open, and means for imparting rotation to the ring.

12. An apparatus for severing a circumferential slice from a fruit, including parallel spaced pairs of cutting devices arranged about a common axis of rotation with adjacent central portions lying in spaced relation, affording a stone receiving recess, a rotatable ring mounting the knives and split transversely on the line of the cutting edge of one pair of knives, a split bearing within which said ring is rotatably mounted, and means for imparting rotation to the ring.

13. An apparatus for severing a circumferential slice from a fruit, including parallel spaced pairs of cutting devices arranged about a common axis of rotation with adjacent portions lying in spaced relation, affording a stone receiving recess, a rotatable ring mounting the knives and split transversely on the line of the cutting edge of one pair of knives, a split bearing within which the ring is rotatably mounted, and means for holding said ring portions from accidental disengagement with the ring bearing when the same is opened.

14. An apparatus for severing and removing a circumferential slice from a fruit, including a bearing split transversely to provide a pair of cooperating sections, a frame rotatable within the bearing and split transversely to provide sections co-extensive with the bearing sections to split on the line therewith, said frame mounting plates disposed in parallel spaced relation and divided on a line corresponding to the split of the frame providing cutting devices, one set of cutting devices being divided on a line at an angle to said frame split to afford a stone recess, a yielding cutting member in each of said recesses, means for rotating the frame on an axis at right angles to the plane of the plates, and a member projecting inwardly between the plates and provided with a cutting edge and a guiding surface.

15. An apparatus for severing and removing a circumferential slice from a fruit, including a bearing split transversely to provide a pair of cooperating sections, a frame rotatable within the bearing and split transversely to provide sections co-extensive with the bearing sections to split on the line therewith, said frame mounting plates disposed in parallel spaced relation and divided on a line corresponding to the split of the frame providing cutting devices, one set of cutting devices being divided on a line at an angle to said frame split to afford a stone recess, a yielding cutting member in each of said recesses, and means for imparting a complete rotation to the frame with the dividing line of the plates registering with the line of split of the bearing.

16. An apparatus for severing and removing a circumferential slice from a fruit, including a pair of parallel spaced plates divided transversely to provide cutting devices with their cutting edges disposed opposing each other, said cutting devices provided with a pit receiving recess, and a yielding pit engaging member movably mounted in said recess.

17. An apparatus for severing and removing a circumferential slice from a fruit, including a bearing split transversely to provide a pair of cooperating sections, a frame rotatable in the bearing and divided longitudinally into duplicate rings, each split transversely providing sections co-extensive with the bearing sections to split on a line therewith, a plate mounted by each ring and disposed in parallel relation and divided on a line corresponding to the splits in the rings providing cutting devices, one set of cutting devices being divided on a line at an angle to said ring splits to afford a stone recess, a longitudinal movable spring held cutting member having a notched outer end in each recess, a fruit ejecting member projecting between the plates, and means for revolving the plates.

18. An apparatus for severing and removing a circumferential slice from a fruit, including cutting means for encompassing the fruit and for cutting inwardly thereinto in spaced parallel planes and for gripping the stone, means for rotating the encompassing means on an axis through the stone at right angles to the planes of the slice forming cut, and means extending between the encompassing slice cutting means for ejecting the slice from therebetween.

19. An apparatus for severing and removing a circumferential slice from a fruit, including hingedly connected cutting means adapted for opening to receive a fruit and when closed for cutting circumferentially thereinto in spaced parallel planes and for gripping the stone, means for rotating the encompassing means on an axis through the stone at right angles to the planes of the slice forming cut, and slice ejecting means extending between the encompassing means and adapted for bearing on the stone.

20. An apparatus for severing and removing a circumferential slice from a fruit, including sectional cutting means hinged together for encompassing the fruit and for cutting inwardly thereinto in spaced parallel circumferential planes, means for rotating the encompassing means on an axis through the stone at right angles to the planes of a slice forming cut, means extending between the encompassing slice cutting means for ejecting the slice therefrom, and yieldable means for causing the ejecting means to bear onto the surface of the stone.

21. The method of bisecting fruit and for the removal of a circumferential slice therefrom, which consists in encompassing the fruit in two parallel spaced planes and cutting the body thereof inwardly to the approximate depth of the stone, pit or core, revolving the fruit and encompassing means and ejecting a cut slice from between the encompassing means while the fruit is being revolved.

In testimony whereof I have signed my name to this specification.

ARTHUR L. DUNCAN.